(12) United States Patent
Hart et al.

(10) Patent No.: US 11,216,172 B1
(45) Date of Patent: Jan. 4, 2022

(54) SCROLLING FEED WHILE MAINTAINING EXPANDED SIZE OF POST IN FEED

(71) Applicant: Twitter, Inc., San Francisco, CA (US)

(72) Inventors: David Hart, San Francisco, CA (US); Lisa Ding, San Francisco, CA (US); Jose Hernandez, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/949,241

(22) Filed: Oct. 21, 2020

Related U.S. Application Data

(60) Provisional application No. 62/924,379, filed on Oct. 22, 2019.

(51) Int. Cl.
*G06F 3/0485* (2013.01)
*G06F 3/0488* (2013.01)
*G06F 3/0482* (2013.01)
*G06F 3/0484* (2013.01)

(52) U.S. Cl.
CPC .......... *G06F 3/0485* (2013.01); *G06F 3/0482* (2013.01); *G06F 3/04845* (2013.01); *G06F 3/04883* (2013.01); *G06F 2203/04806* (2013.01)

(58) Field of Classification Search
CPC ... G06F 3/0485; G06F 3/0482; G06F 3/04883
See application file for complete search history.

(56) References Cited

U.S. PATENT DOCUMENTS

| | | | |
|---|---|---|---|
| 8,893,036 B1* | 11/2014 | Wabyick | G06F 3/0485 715/786 |
| 2008/0168402 A1* | 7/2008 | Blumenberg | G06F 9/451 715/863 |
| 2014/0040776 A1* | 2/2014 | Dann | G06F 3/0485 715/753 |
| 2016/0004761 A1* | 1/2016 | Zhang | H04L 51/32 707/740 |
| 2016/0182423 A1* | 6/2016 | Tevosyan | G06F 3/0482 715/752 |
| 2017/0025096 A1* | 1/2017 | Fan | H04L 51/04 |
| 2017/0242561 A1* | 8/2017 | Ochi | G06F 3/0481 |
| 2017/0318020 A1* | 11/2017 | Kamath | H04L 67/42 |
| 2018/0232121 A1* | 8/2018 | Lewis | G06F 3/0485 |
| 2019/0155914 A1* | 5/2019 | Xiao | G06F 16/24578 |

\* cited by examiner

*Primary Examiner* — Mong-Shune Chung
(74) *Attorney, Agent, or Firm* — Brake Hughes Bellermann LLP

(57) ABSTRACT

A method can include presenting a feed, the feed including at least a first post, a second post, and a third post; receiving a selection gesture in an area corresponding to the first post; in response to receiving the selection gesture, expanding a size of the first post from an original size to an expanded size; receiving a scrolling gesture; and in response to receiving the scrolling gesture, moving the first post, the second post, and the third post in a same direction as the scrolling gesture while maintaining the expanded size of the first post.

20 Claims, 14 Drawing Sheets

SCROLLING FEED WHILE MAINTAINING EXPANDED SIZE OF POST IN FEED

CROSS-REFERENCE TO RELATED APPLICATION

This Application claims the benefit of priority based on U.S. Provisional Application No. 62/924,379, entitled, "SCROLLING FEED WHILE MAINTAINING EXPANDED SIZE OF POST IN FEED," filed on Oct. 22, 2019, the disclosure of which is hereby incorporated by reference.

TECHNICAL FIELD

This description relates to presenting content within a social media application.

SUMMARY

According to an example, a method can include presenting a feed, the feed including at least a first post, a second post, and a third post; receiving a selection gesture in an area corresponding to the first post; in response to receiving the selection gesture, expanding a size of the first post from an original size to an expanded size; receiving a scrolling gesture; and in response to receiving the scrolling gesture, moving the first post, the second post, and the third post in a same direction as the scrolling gesture while maintaining the expanded size of the first post.

According to an example, a non-transitory computer-readable storage medium can comprise instructions stored thereon. When executed by at least one processor, the instructions can cause a computing system to present a feed, the feed including at least a first post, a second post, and a third post; receive a selection gesture in an area corresponding to the first post; in response to receiving the selection gesture, expand a size of the first post from an original size to an expanded size; receive a scrolling gesture; and in response to receiving the scrolling gesture, move the first post, the second post, and the third post in a same direction as the scrolling gesture while maintaining the expanded size of the first post.

According to an example, a computing system can include at least one processor, and a non-transitory computer-readable storage medium comprising instructions stored thereon. When executed by the at least one processor, are can cause the computing system to present a feed, the feed including at least a first post, a second post, and a third post; receive a selection gesture in an area corresponding to the first post; in response to receiving the selection gesture, expand a size of the first post from an original size to an expanded size; receive a scrolling gesture; and in response to receiving the scrolling gesture, move the first post, the second post, and the third post in a same direction as the scrolling gesture while maintaining the expanded size of the first post.

The details of one or more implementations are set forth in the accompanying drawings and the description below. Other features will be apparent from the description and drawings, and from the claims.

BRIEF DESCRIPTION OF THE DRAWINGS

FIG. 7 shows an example in which the social media application displays a root post identifier that identifies a root post that other posts are responsive to.

Like reference numbers refer to like elements.

DETAILED DESCRIPTION

A social media application can present a feed including multiple posts. A user can select one of the posts by inputting a selection gesture onto an element of the selected post. The application can respond to the selection by expanding the selected post and/or expanding an element of the post. The user can input a scrolling gesture into the application. In response to receiving the scrolling gesture, the application can move the multiple posts while maintaining the expanded size of the selected post.

Figure 1:
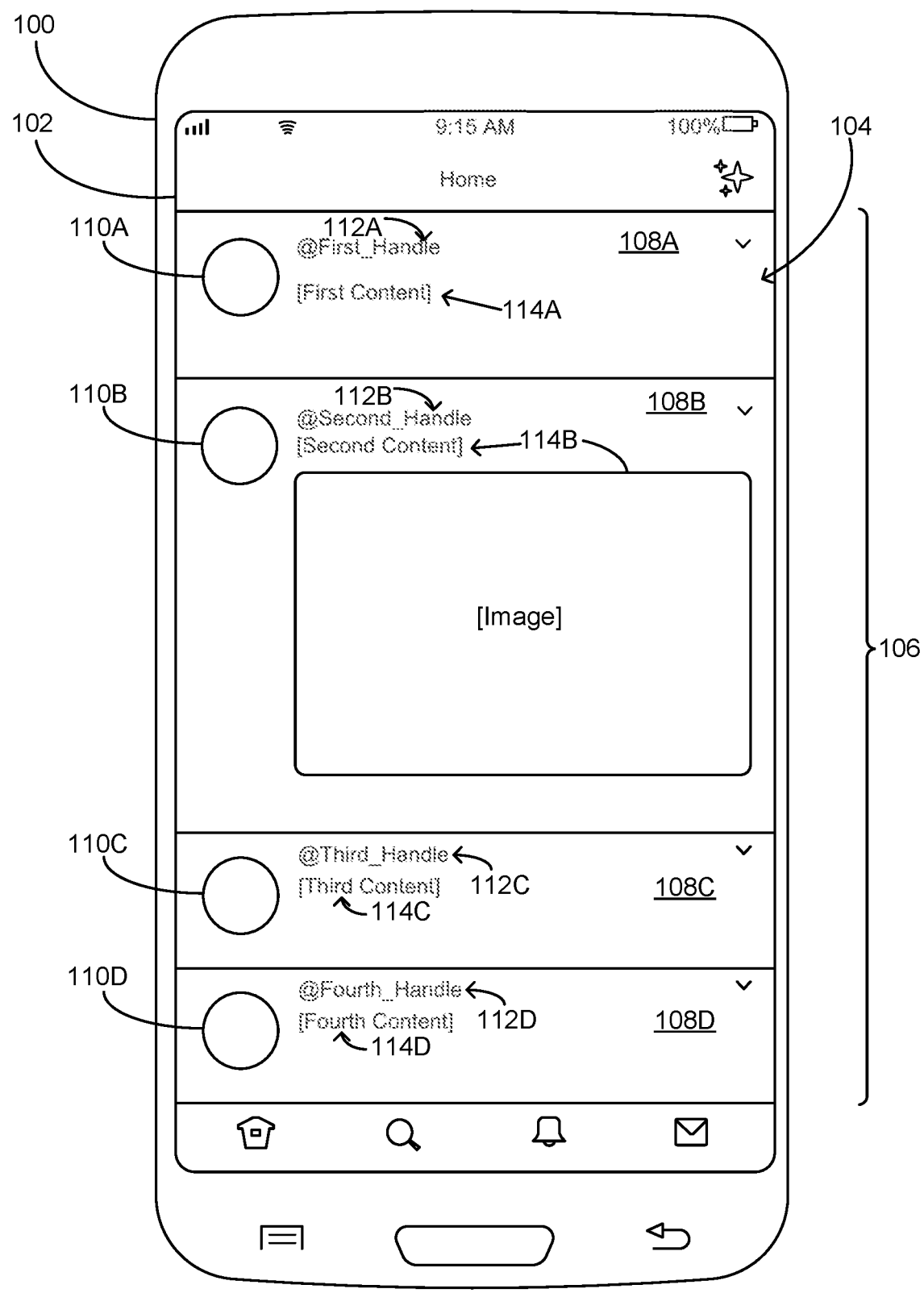
FIG. 1 shows a mobile computing device presenting a feed within a social media application.

FIG. 1 shows a computing device 100 with a graphical user interface (GUI) 104 presenting a feed 106. The computing device 100 can be a device capable of executing instructions, receiving input, and providing output, such as a smartphone, a tablet computing device, a thin client, a laptop or notebook computer, or a desktop computer, as non-limiting examples. The computing device 100 can expand a selected post and, in response to a scrolling gesture, move posts while maintaining an expanded size of the selected post.

The computing device 100 can include a display 102. The display 102 can present and/or output graphical and/or visual output, such as text and/or images. In some examples, the display 102 can receive input, such as touch input and/or gestures, including taps and/or swipes.

The computing device 100 can generate a graphical user interface (GUI) 104 within the display 102. The GUI 104 can be generated by an application, such as a social media application, executing (e.g., running) on the computing device 100. The GUI 104 can present graphical and/or textual information, such as a feed, as described below. The GUI 104 can receive input, such as taps and/or swipes.

In the example shown in FIG. 1, the GUI 104 can present a feed 106. The feed 106 can include multiple posts, such as a first post 108A, a second post 108B, a third post 108C, and/or fourth post 108D. The posts 108A, 108B, 108C, 108D can include information uploaded by, and/or associated with, accounts. The posts 108A, 108B, 108C, 108D can include information likely to be interesting to a user of the computing device 100, and/or posts associated with and/or uploaded by accounts that the user is following. The user of the computing device 100 can be associated with an account that is different than the accounts associated with the posts 108A, 108B, 108C, 108D.

In some examples, each of the posts 108A, 108B, 108C, 108D can include a symbol. The symbol can include an avatar 110A, 110B, 110C, 110D and/or a handle 112A, 112B, 112C, 112D (FIG. 1 represents the avatars 110A, 110B, 110C, 110D as circles, but each account and/or post 108A, 108B, 108C, 108D can have a distinct avatar 110A, 110B, 110C, 110D). The avatar 110A, 110B, 110C, 110D can include an image inside a circle and/or ellipse. The image can be associated with, and/or have previously been uploaded by, the account associated with the respective post 108A, 108B, 108C, 108D. The handle 112A, 112B, 112C, 112D can include a text string uniquely associated with the account associated with the respective post 108A, 108B, 108C, 108D.

In some examples, each of the posts 108A, 108B, 108C, 108D can include content 114A, 114B, 114C, 114D. The content 114A, 114B, 114C, 114D can include text and/or images (such as photographs) uploaded by a user of the account associated with the respective post. In the example shown in FIG. 1, the contents 114A, 114C, 11D associated with the first, third, and fourth posts 108A, 108C, 108D include only text, while the content 114B associated with the second post 108B includes both text and a picture and/or image.

A user of the computing device 100 may desire to focus on one of the posts 108A, 108B, 108C, 108D. The user can request the social media application to expand one of the posts, by providing input to the post 108A, 108B, 108C, 108D such as to one of the elements in the post 108A, 108B, 108C, 108D. The user can, for example, provide input such as a tap or swipe onto the avatar 110A, 110B, 110C, 110D, handle 112A, 112B, 112C, 112D, and/or content 114A, 114B, 114C, 114D included in the post 108A, 108B, 108C, 108D.

Figure 2A:
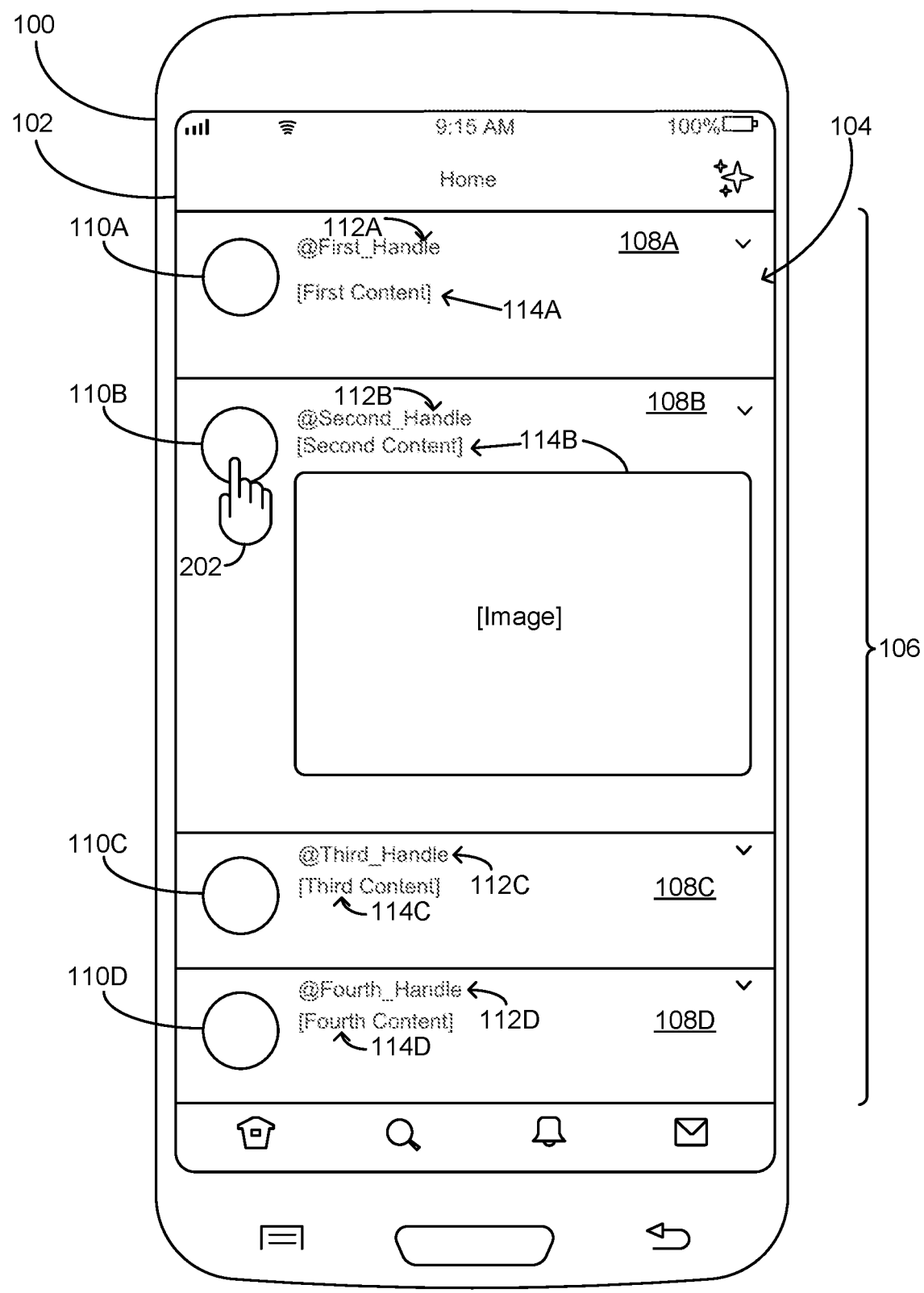
FIGS. 2A, 2B, and 2C show a user selecting a post within the feed of FIG. 1.

FIG. 2A shows a user inputting a selection gesture 202 to the avatar 110B within the second post 108B. The selection gesture 202 can represent a cursor hovering over the symbol, or a symbolic representation of the user tapping or swiping on the avatar 110B with a body part such as a finger or a stylus in an example in which the display 102 is a touchscreen. The selection gesture 202 can include, for example, a tap on the avatar 110B, a tap and hold on the avatar 110B, or a double tap on the avatar 110B, as non-limiting examples. The user can input the gesture 202 to the avatar 110B and/or an area on the display 102 corresponding to the avatar 110B because, for example, the user is interested in viewing the post 108B in greater detail. The computing device 100 can, in response to receiving the selection gesture 202 within the post 108B and/or area corresponding to the post 108B, expand the post 108B and, in response to receiving a scrolling gesture, move the feed 106 while maintaining the expanded size of the post 108B.

Figure 2B:
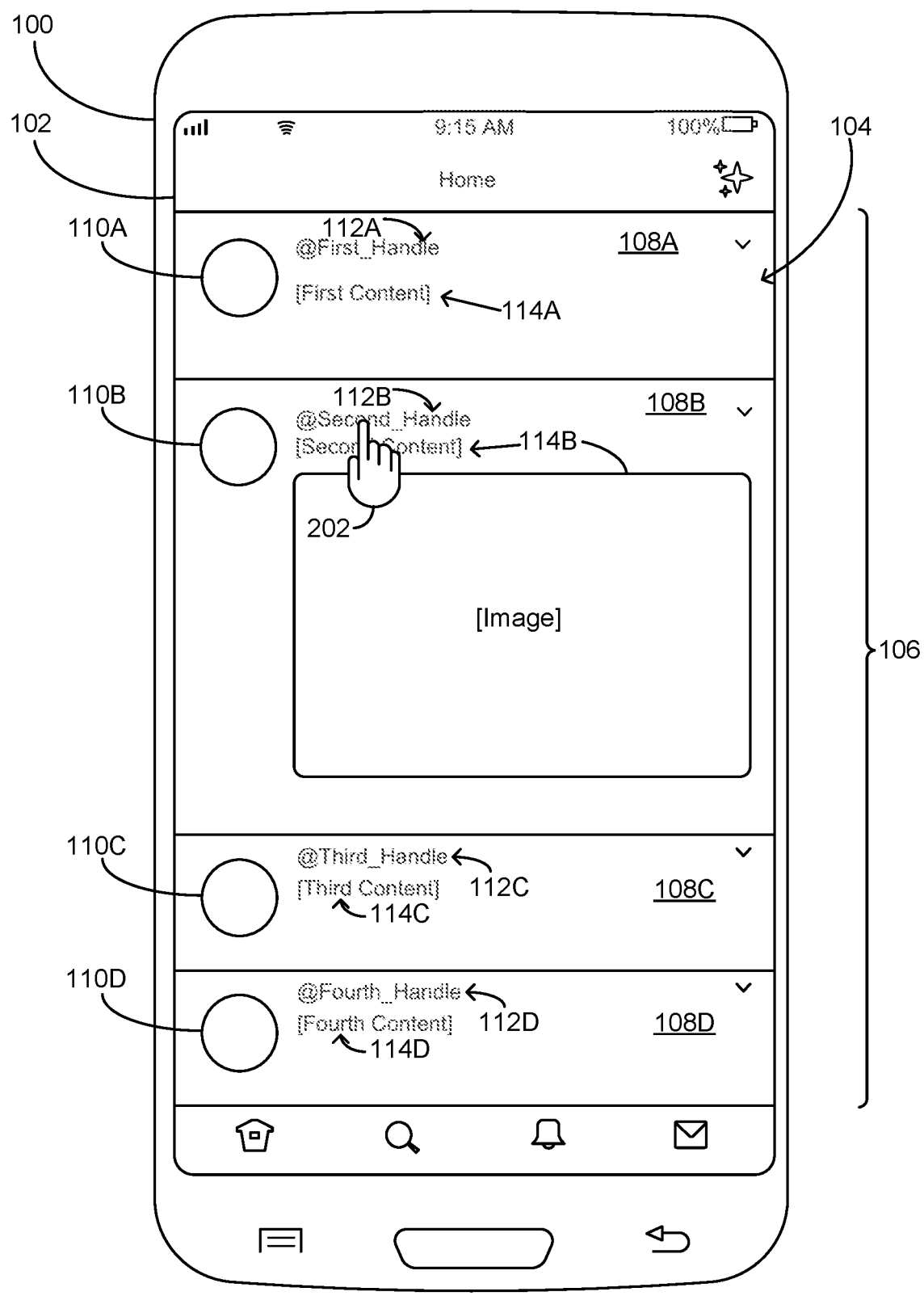

FIG. 2B shows a user inputting the selection gesture 202 to the handle 112B within the second post 108B. The selection gesture 202 can represent a cursor hovering over the symbol, or a symbolic representation of the user tapping or swiping on the handle 112B with a body part such as a finger or a stylus in an example in which the display 102 is a touchscreen. The selection gesture 202 can include, for example, a tap on the handle 112B, a tap and hold on the handle 112B, or a double tap on the handle 112B, as non-limiting examples. In this example, the user has inputted the gesture 202 to a handle 112B, and/or an area on the display 102 corresponding to the handle 112B, included in the post 108B to view the post 108B in greater detail. The computing device 100 can, in response to receiving the selection gesture 202, expand the post 108B and, in response to receiving a scrolling gesture, move the feed 106 while maintaining the expanded size of the post 108B.

Figure 2C:
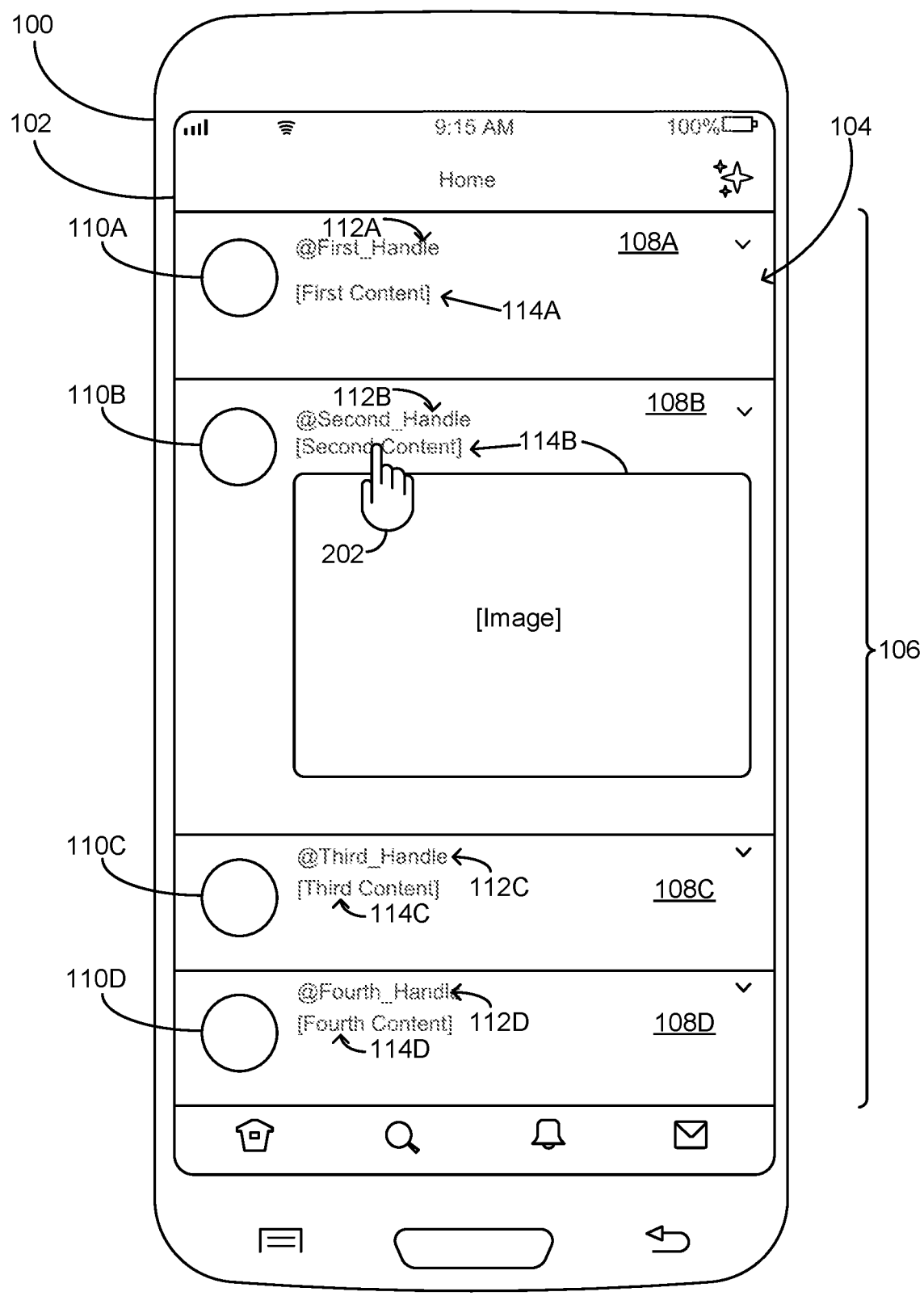

FIG. 2C shows a user inputting the gesture 202 to the content 114B within the second post 108B. While FIG. 2C shows the user inputting the gesture 202 into the text portion of the content 114B, the user can also input the gesture 202 into the image portion of the content 114B. The selection gesture 202 can represent a cursor hovering over the symbol, or a symbolic representation of the user tapping or swiping on the content 114B with a body part such as a finger or a stylus in an example in which the display 102 is a touchscreen. The gesture 202 can be a tap or a click, and/or can represent a cursor, or a symbolic representation of the user or cursor tapping or swiping on the content 114B. The selection gesture 202 can include, for example, a tap on the content 114B, a tap and hold on the content 114B, or a double tap on the content 114B, as non-limiting examples. In this example, the user has inputted the gesture 202 to the content 114B, and/or an area of the display 102 corresponding to the content 114B, included in the post 108B to view the post 108B in greater detail. The computing device 100 can, in response to receiving the selection gesture 202, expand the post 108B and, in response to receiving a scrolling gesture, move the feed 106 while maintaining the expanded size of the post 108B.

Figure 3:
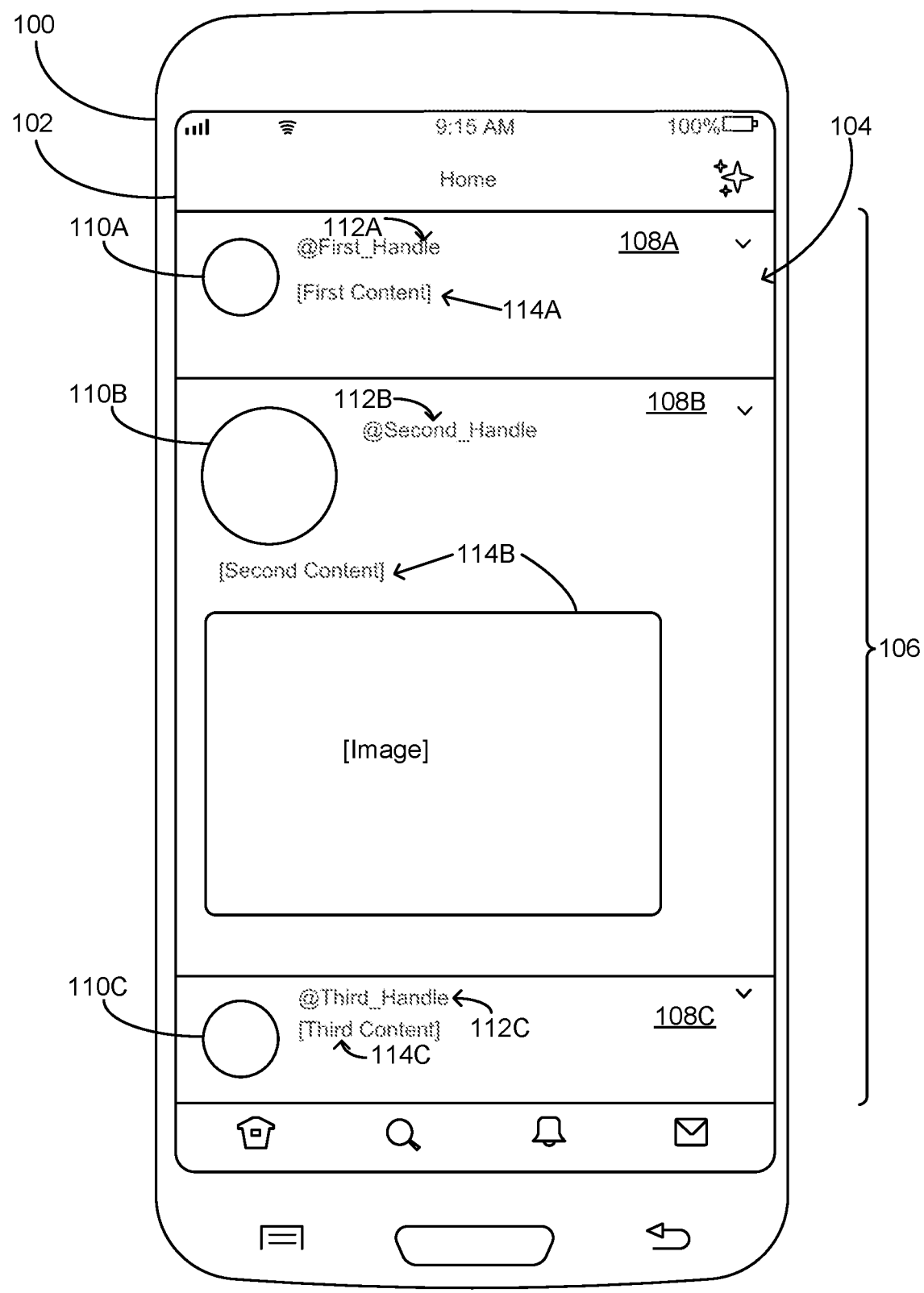
FIG. 3 shows the selected post in an expanded state.

FIG. 3 shows the selected post 108B in an expanded state. The social media application can expand the selected post 108B from the original state shown in FIGS. 1, 2A, 2B, and 2C to the expanded state shown in FIG. 3 in response to receiving the selection gesture 202 in the post 108B and/or based on recognizing the selection gesture within the post 108B. While FIG. 3 shows the second post 108B as expanded based on the application receiving the selection gesture 202 in FIG. 2A, 2B, or 2C, the user can select any of the posts, 108A, 108B, 108C, 108D, and any of the posts 108A, 108B, 108C, 108D can be expanded based on a selection gesture from the user within the post 108A, 108B, 108C, 108D.

In the example shown in FIG. 3, a size of the post 108B has been expanded in a vertical direction from an original size shown in FIGS. 1, 2A, 2B, and 2C, to an expanded size shown in FIG. 3. In the example shown in FIG. 3, a size of the avatar 110B included in the post 108B has increased and/or expanded from an original size shown in FIGS. 1, 2A, 2B, and 2C, to an expanded size shown in FIG. 3. In the example shown in FIG. 3 with the post 108B in the expanded size and/or expanded state, a location of the content 114B relative to the location of the avatar 110B has changed compared to their locations when the post 108B was in the original size and/or original state. In the example shown in FIG. 3 with the post 108B in the expanded state and/or expanded size, the content 114B is located below the avatar 110B, rather than to the right of the avatar 110B in the original state and/or original size. In some examples, with the post 108B in the expanded state, the post 108B can present and/or include additional elements beyond what the post 108B included in the original state, and/or content 114B which was truncated in the original state can be presented fully.

In some examples, when the selected post 108B is in the expanded state and/or expanded size, the GUI 104 can present the ancestry and/or lineage of the selected post 108B. The ancestry and/or lineage of the selected post 108B can include posts to which the selected post replied, posts to which the replied-to posts replied, all the way to a root post. The ancestry can be indicated by lines or other indicators from the selected post 108B to the replied-to post(s). The computing device 100 can maintain the expanded size the post 108B while scrolling the feed 106 in response to a scrolling gesture.

In the example shown in FIG. 3, the expansion of the post 108B leaves less room remaining on the display 102 and/or GUI 104, leaving less room for other posts 108A, 108C, 108D. In this example, the bottom-most post 108D (shown in FIGS. 1, 2A, 2B, and 2C) is no longer displayed when the post 108B is in the expanded state and/or expanded size. In some examples, the application can stop and/or cease displaying the top-most post 108A when the post 108B is in the expanded state and/or expanded size.

Figure 4:
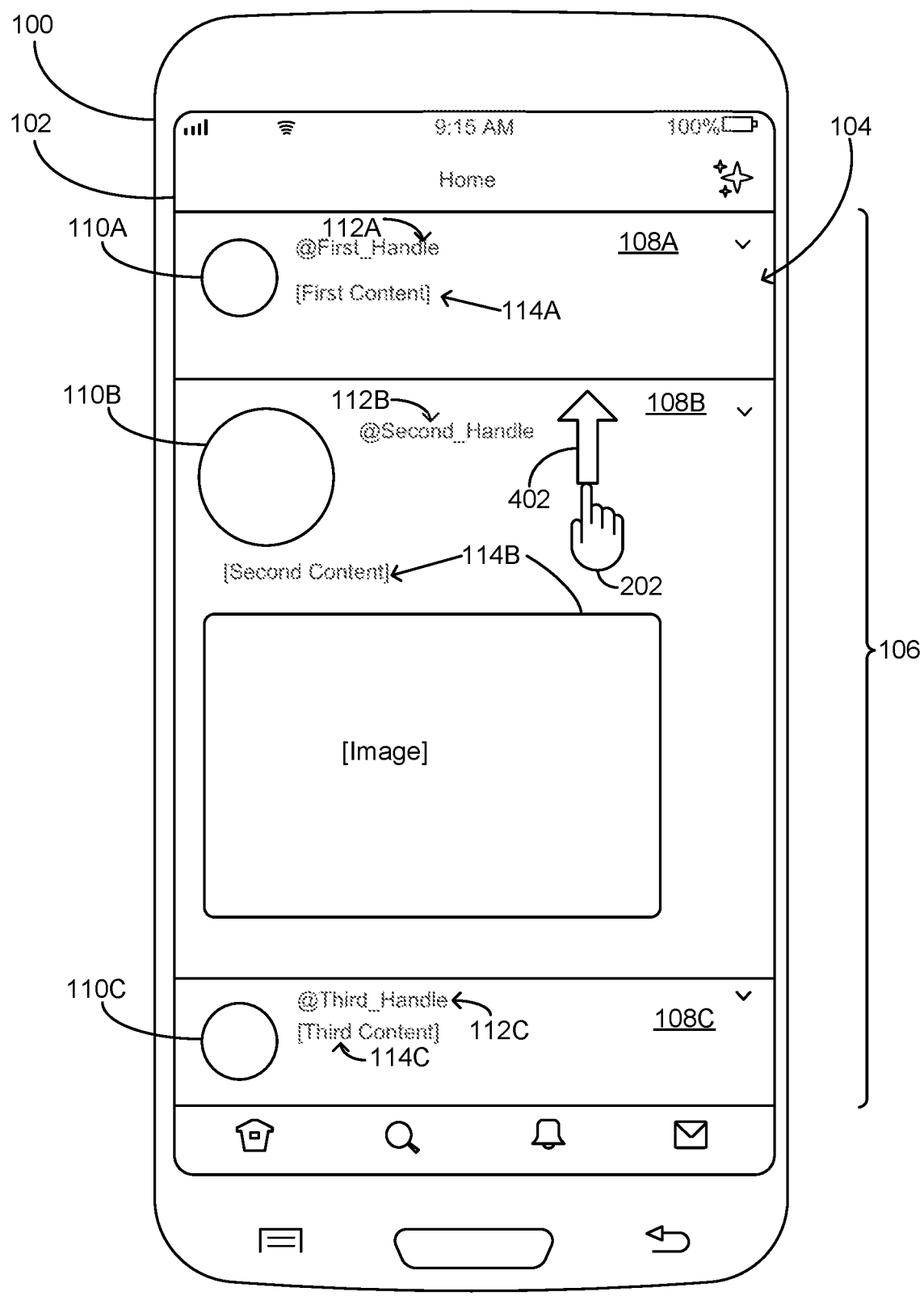
FIG. 4 shows the user scrolling upward while the selected post is in the expanded state.

FIG. 4 shows the user scrolling upward while the selected post 108B is in the expanded state. The user can scroll upward to view additional content, such as additional posts, within the feed 106, which have not been displayed and/or which appear below the displayed posts 108A, 108B, 108C.

The user can input a swipe up gesture 402 (which can also be considered a scroll gesture, an upward scrolling gesture, or a scroll up gesture) into the GUI 104. The user can input the swipe up gesture 402 anywhere in the GUI 104, such as into the post 108B that has been expanded. The user can input the swipe up gesture by placing a cursor or input device (such as a finger or stylus) onto the GUI 104, holding the input device on the GUI 104 (or holding a button down in the example of a cursor), and dragging the input device or cursor in an upward direction. The computing device 100 can respond to the upward swipe 402 by scrolling the feed 106 and/or posts 108A, 108B, 108C within the feed 106 in a same direction as the swipe gesture 402 and/or scroll gesture, such as upward. The computing device 100 can maintain the expanded size the post 108B while scrolling the feed 106 in response to the scrolling gesture 402.

Figure 5A:
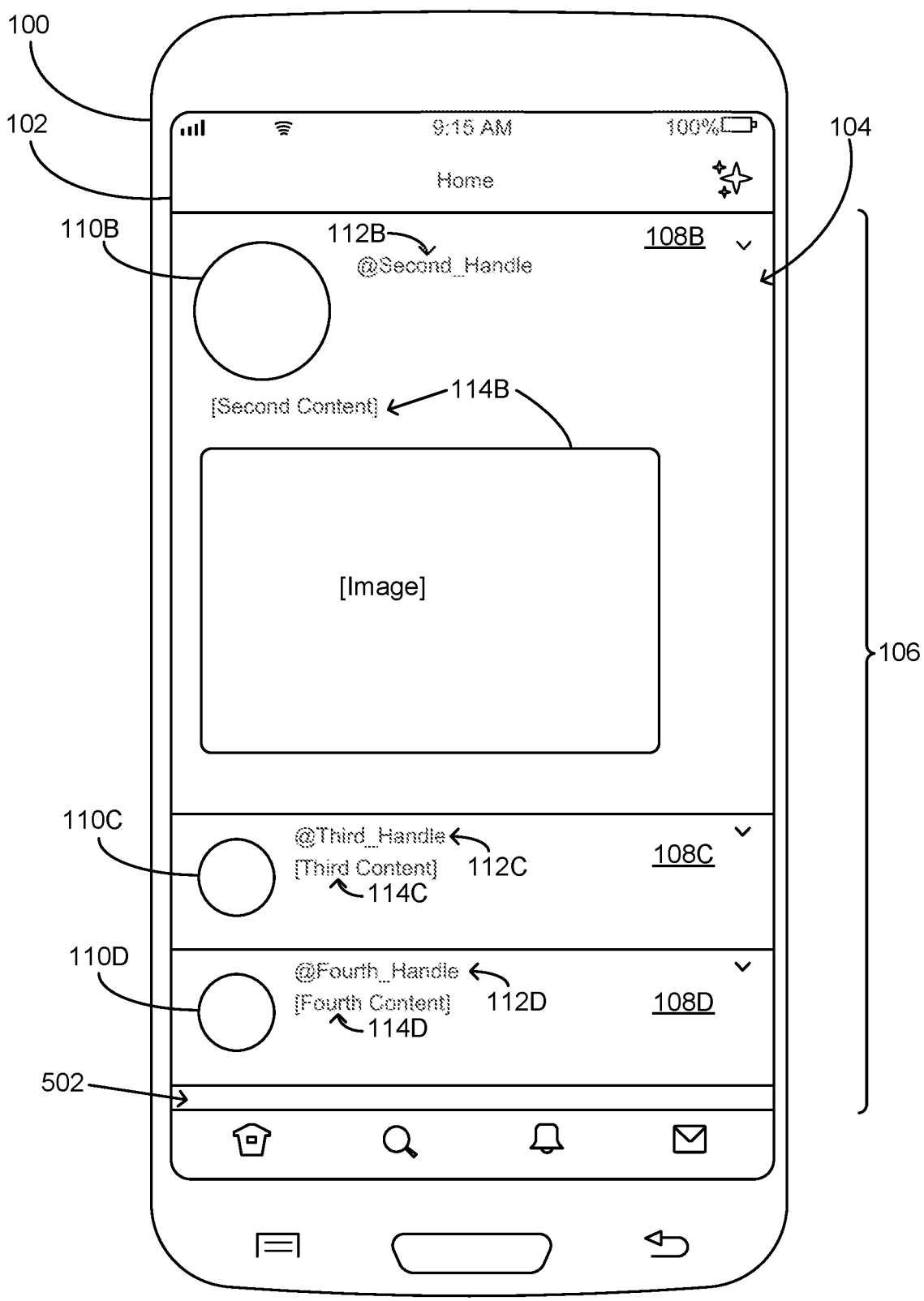
FIG. 5A shows an example in which the social media application has no additional content to display after the user scrolled upward.

FIG. 5A shows an example in which the social media application has no additional content to display after the user scrolled upward. In this example, the user has scrolled upward, as shown in FIG. 4. The application has responded to the upward scroll by moving the posts 108A, 108B, 108C shown in FIG. 4, as well as the post 108D that was hidden after the post 108B was expanded, upward on the GUI 104 in the same direction as the upward scroll and/or swipe up gesture 402. The upward movement of the posts 108A, 108B, 108C, 108D has caused the post 108A to no longer be visible on the display 102, and has caused the post 108D to again be visible on the display 102. With space available on the display 102 below the post 108D, the application can display additional content, if any, after and/or below the post 108D.

In the example shown in FIG. 5A, the application has no additional content to display after and/or below the post 108D. The lack of additional content to display after and/or below the post 108D is represented by blank area 502 below the last and/or lower-most post 108D.

Figure 5B:
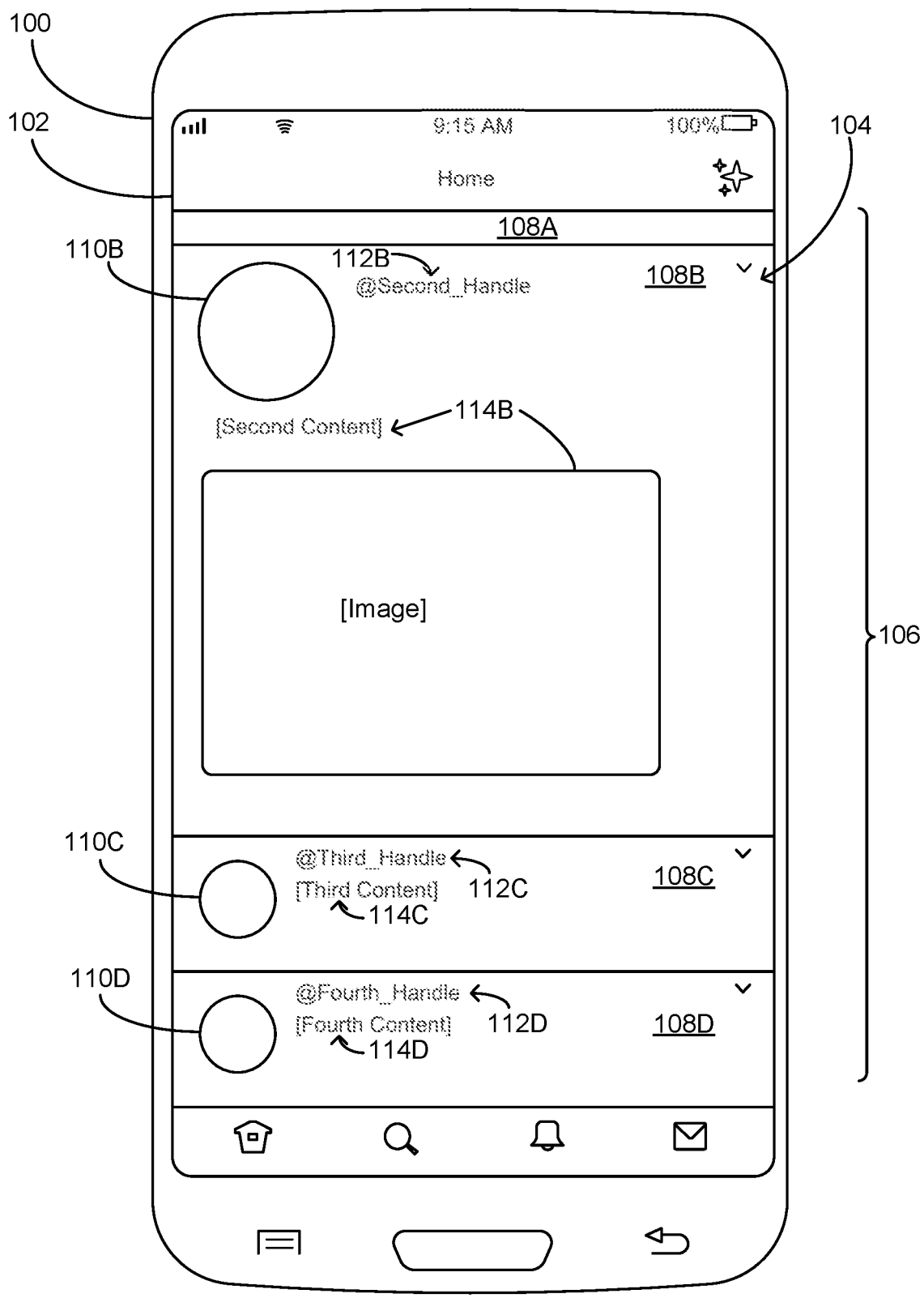
FIG. 5B shows an example in which the social media application has sent posts downward after the user scrolled upward based on no additional content to display.

FIG. 5B shows an example in which the social media application has sent posts 108B, 108C, 108D downward after the user scrolled upward based on no additional content to display. After and/or based on the user scrolling upward and the social media application determining that no additional content and/or posts are available to display, the social media application can send the posts 108B, 108C, 108D downward to occupy the blank area 502 shown in FIG. 5A. Sending the posts 108B, 108C, 108D downward, and/or in an opposite direction than the scrolling gesture 402, can free space toward the top of the display 102 and/or GUI 104 to display and/or present the post 108A and/or a portion of the post 108A.

Figure 6A:
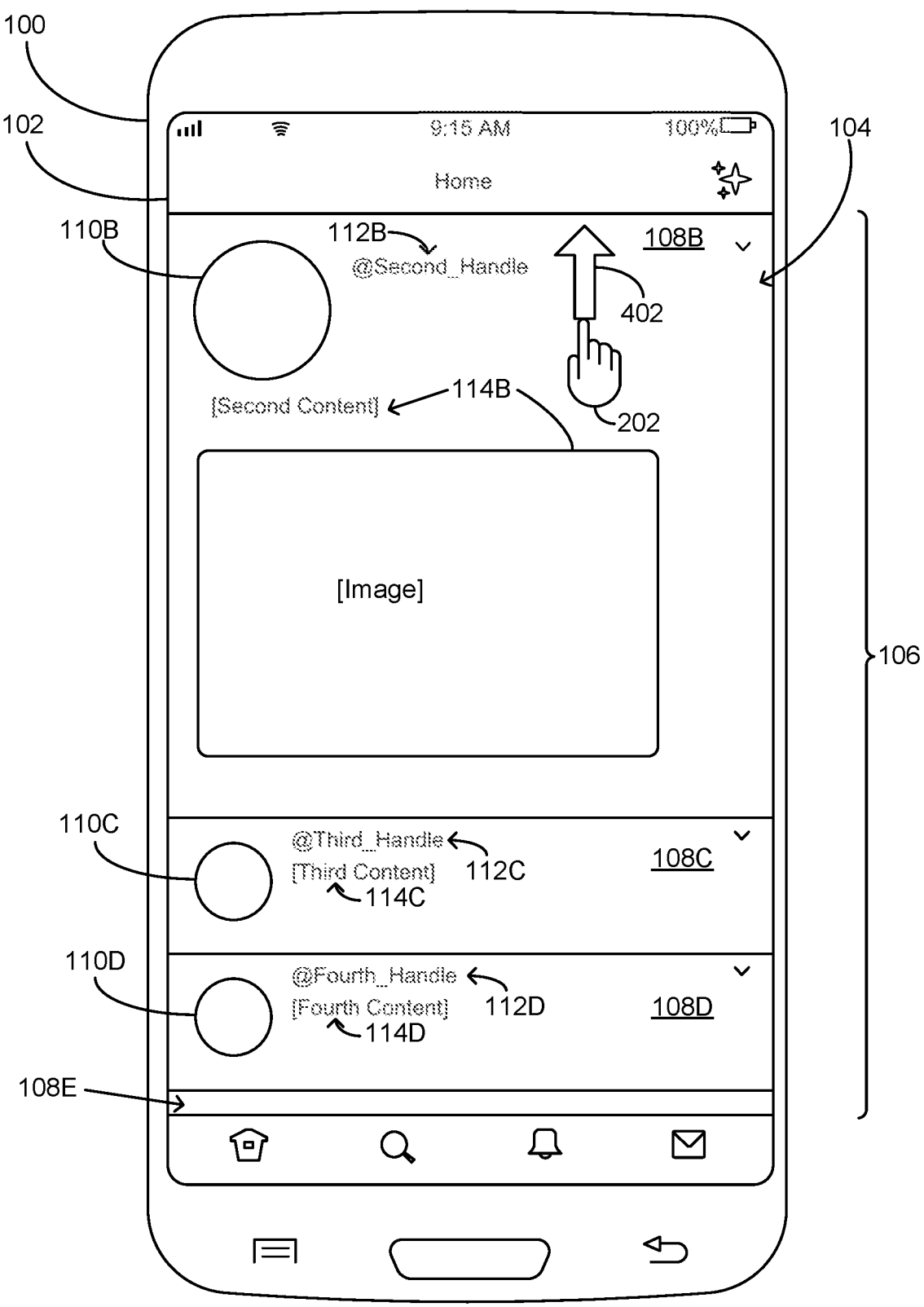
FIG. 6A shows an example in which the social media application has additional content to display after the user scrolled upward.

FIG. 6A shows an example in which the social media application has additional content to display after the user scrolled upward. After the user has inputted the scroll upward gesture 402, the application can cause the posts 108A, 108B, 108C, 108D to move upward in the same direction as the scroll upward gesture 402. In the example shown in FIG. 6A, the moving upward of the posts 108A, 108B, 108C, 108D causes the top post 108A shown in FIG. 4 to no longer be displayed, and a new post 108E, which can be considered additional content, to be partially displayed after the post 108D.

Figure 6B:
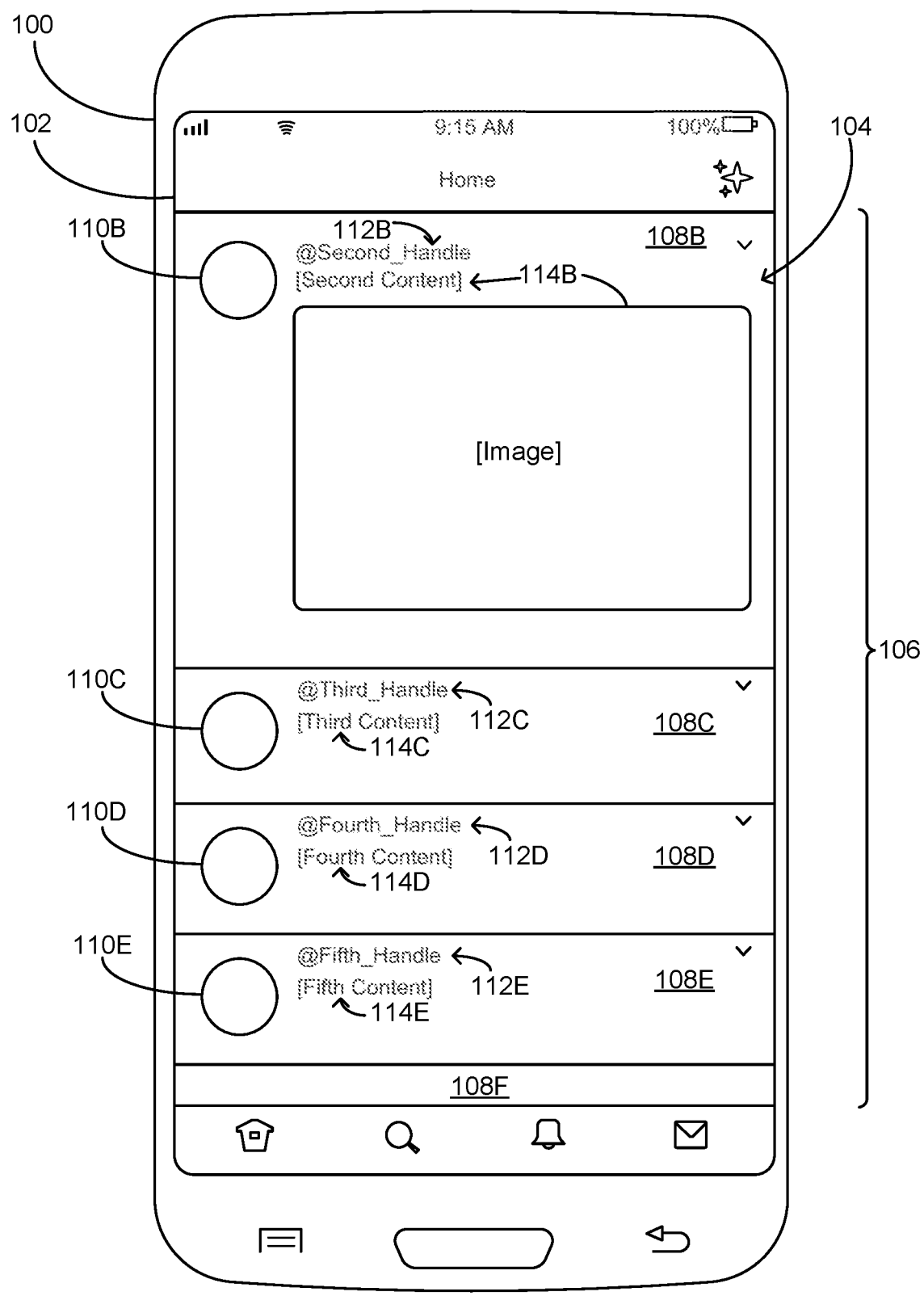
FIG. 6B shows an example in which the selected post is returned to an original state after the user scrolled upward based on the social media application having additional content to display.

FIG. 6B shows an example in which the selected post 108B is returned to an original state after the user scrolled upward based on the social media application having additional content to display. In some examples, after the social media application has increased and/or expanded the size of the post 108B based on the user selecting the post 108B, as shown and described with respect to FIGS. 2A, 2B, 2C, and 3, in response to the user scrolling upward as shown in FIG. 6A and the social media application determining that additional content is available to display, the social media application can return the selected post 108B from the expanded state shown in FIG. 6A to the original state shown in FIGS. 1 and 6B. Returning the selected post 108B from the expanded state to the original state can include reducing the vertical extension of the post 108B, reducing a size of the avatar 110B, and/or changing a location of the content 114B relative to the avatar 110B such as by locating the content 114B to the right of the avatar 110B instead of below the avatar 110B, as non-limiting examples.

The return to the selected post 108B from the expanded state to the original state can reduce an amount of space on the display 102 occupied by the post 108B, freeing space for the application to display additional posts on the display 102. In the example shown in FIG. 6B, the application displays the entire additional post 108E on the display 102, and a portion of another post 108F.

Returning the selected post 108B from the expanded state and/or expanded size to the original state and/or original size in response to the scrolling gesture 402 and determinations performed by the computing device 100 can reduce the inputs required by the user to return the post 108B to the original state and/or original size. The reduction in required inputs can improve the user experience by freeing the user from having to provide input specifically to return the post 108B to the original state and/or original size. The reduction in required inputs can reduce the processing required for the computing device 100 to listen for, and/or process, inputs, freeing computing resources.

Figure 7:
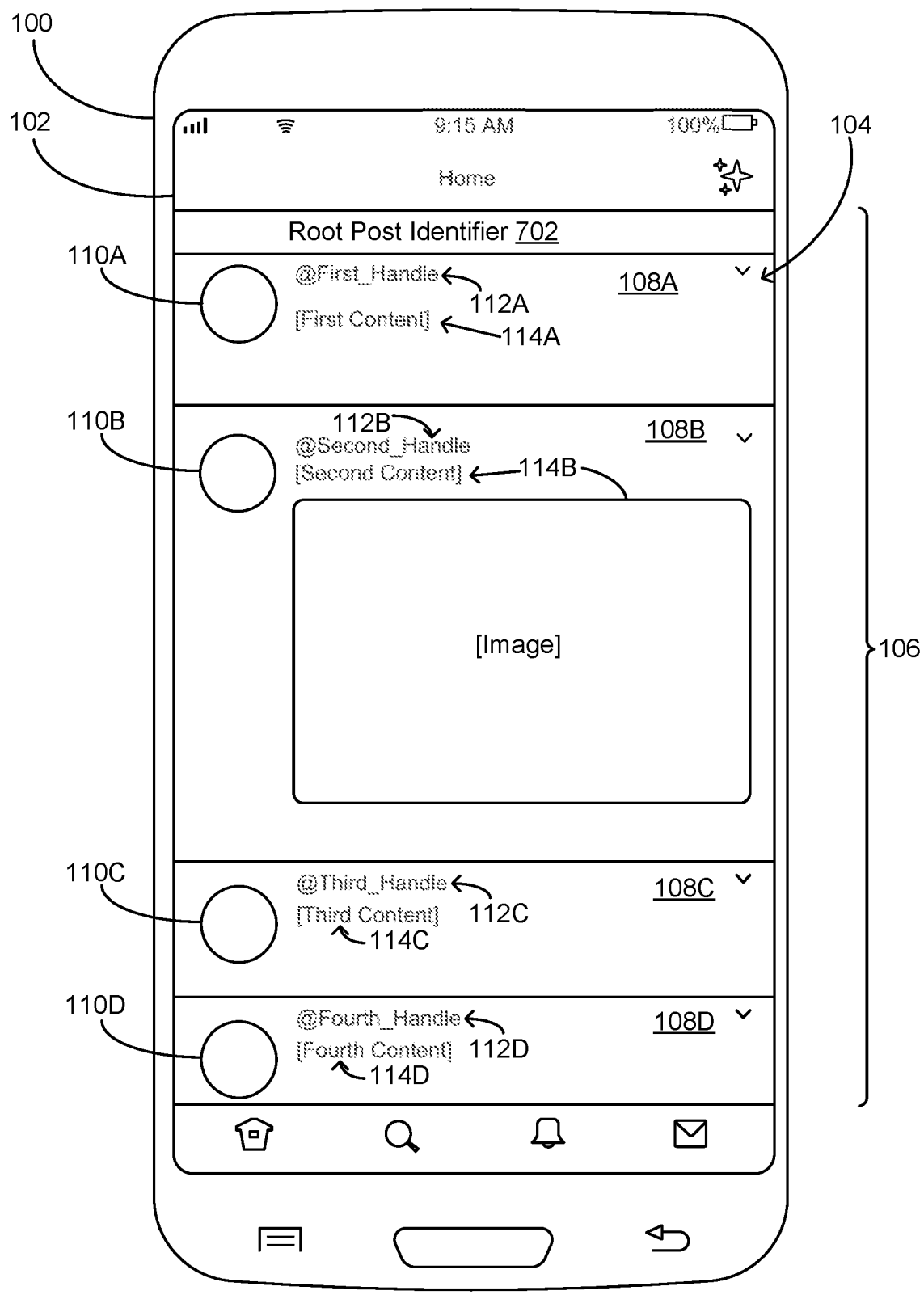

FIG. 7 shows an example in which the social media application displays a root post identifier 702 that identifies a root post that other posts 108A, 108B, 108C, 108D are responsive to. In some examples, the posts 108A, 108B, 108C, 108D can be posted by users in response to a root post. The root post identifier 702 can identify the root post to which the posts 108A, 108B, 108C, 108D presented on the display 102 are responsive to.

Figure 8:
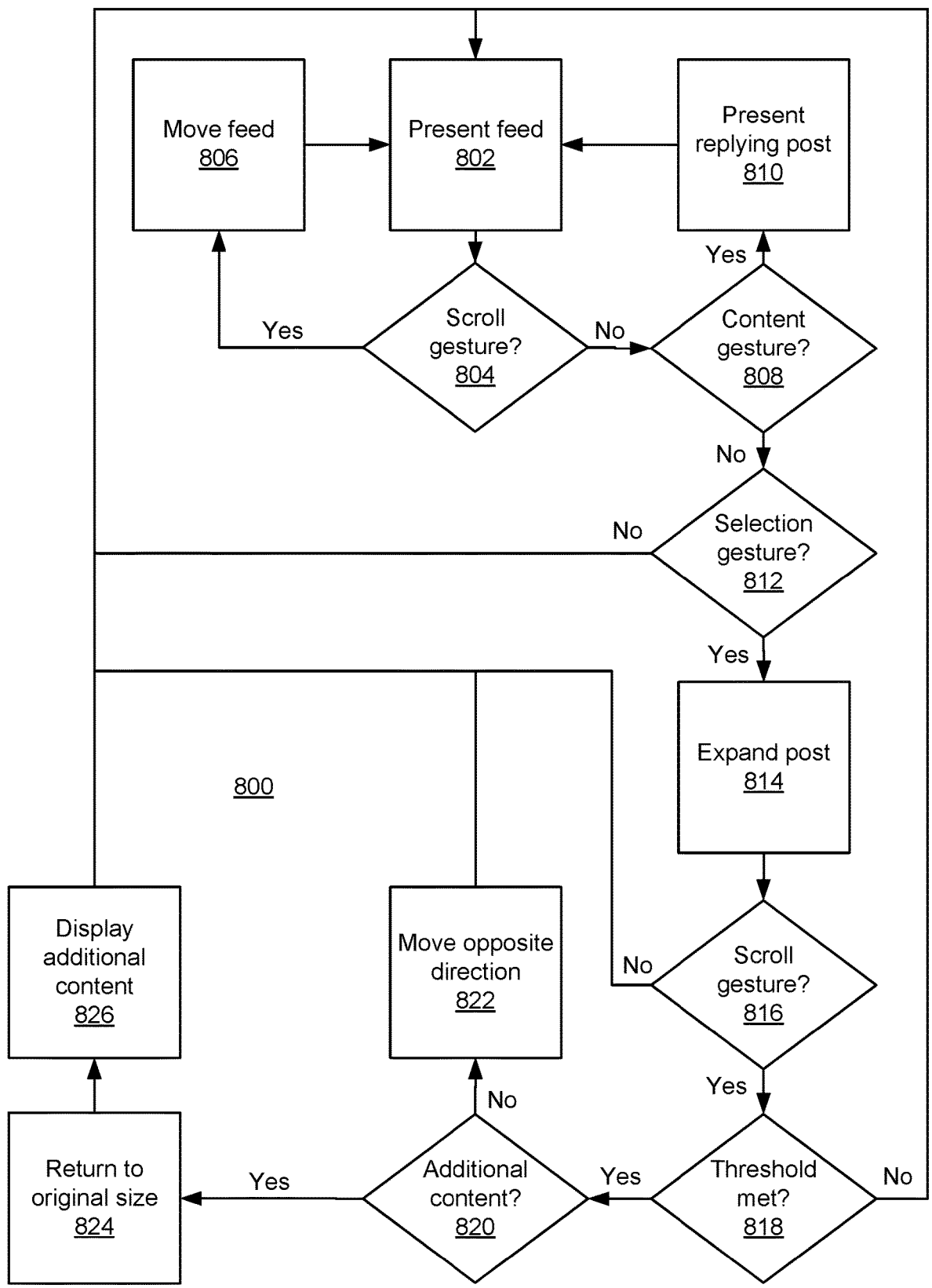
FIG. 8 is a flowchart showing a method of processing scroll gestures.

FIG. 8 is a flowchart showing a method 800 of processing scroll gestures. The method 800 can be performed by a social media application running on a computing device, such as the computing device 100 described above.

The method 800 can include presenting a feed 106 (802). The feed 106 can include multiple posts 108A, 108B, 108C, 108D, as described above.

The method 800 can include determining whether a scrolling gesture 402 was received (804) within a GUI 104 generated by the application. The scrolling gesture 402 can include, for example, a tap-and-move gesture, a click-and-move gesture, or a click-and-drag gesture.

If the application determines that the scrolling gesture 402 was received, then the application can move the feed 106 (806). The application can move the feed (806) by moving posts 108A, 108B, 108C, 108D up or down on the display 102 in the same direction as the scrolling gesture 402. The moving posts 108A, 108B, 108C, 108D up or down on the display 102 can cause some of the posts 108A, 108B, 108C, 108D to no longer be visible on the display 102, and/or cause new and/or additional posts 108E, 108F to be presented on the display 102. After moving the feed 106 (806) in the same direction as the scrolling gesture, the application can continue presenting the feed 106 (802).

If the application determines that a scrolling gesture was not received, then the application can determine whether a content gesture was received (808). A content gesture can include input into a post 108A, 108B, 108C, 108D indicating a desire or request to see content replying to the post 108A, 108B, 108C, 108D into which the input was received and/or provided. The content gesture can include, for example, a double tap or a double click into the post.

If the application determines that a content gesture was received, then the application can determine whether any post(s) were made replying to the post 108A, 108B, 108C, 108D into which the content gesture was received. If no post(s) were made replying to the post 108A, 108B, 108C, 108D, then the application can continue presenting the feed (802) and/or can determine whether a selection gesture was received (812). If the application determines that a post(s) was made replying to the post 108A, 108B, 108C, 108D, then the application can present the post(s) (810) that replies to the post 108A, 108B, 108C, 108D. The application can present the post(s) (810) that replies to the post 108A, 108B, 108C, 108D below the post 108A, 108B, 108C, 108D to which the newly-presented post replies. After presenting the post(s) (810), the application can continue presenting the feed (802).

If the application determines that a content gesture was not received, and/or that no posts were made replying to the post, then the application can determine whether a selection gesture 202 was received (812). The selection gesture 202 can have any combination of features of the selection gesture 202 described above with respect to FIGS. 2A, 2B, and 2C. While this description has described the application as determining whether a scrolling gesture was received (804), then determining whether a content gesture was received (808), and then determining whether a selection gesture was received (812), the application can perform any combination of one, two, or three of these determinations (804, 808, 812) in any order.

If the application determines that a selection gesture 202 was not received, and/or that one or more of the distance threshold, direction, or velocity threshold was not satisfied and/or met, then the application can continue presenting the feed 106 (802). If the application determines that a selection gesture 202 was received, then the application can expand the post 108B (814) in which the selection gesture 202 was received. The application can expand the post 108B by, for example, increasing an amount of space on the display 102 occupied by the post 108B, increasing a size of the avatar 110B, and/or changing the location of the content 114B relative to the avatar 110B, as shown and described with reference to FIG. 3.

While maintaining the post 108B in the expanded state, the application can determine whether a scrolling gesture 402 is received (816) and/or whether a user inputted a scrolling gesture 402. The scrolling gesture 402 can have any combination of features of the scrolling gesture 402 described above with respect to FIG. 4. If the application determines that a scrolling gesture 402 was not received, then the application can continue presenting the feed 802.

If the application determines that a scrolling gesture 402 was received, then the application can determine whether a threshold was satisfied and/or met (818). The threshold can include, for example, a distance that the input device (such as finger or stylus) or cursor moved as part of the scrolling gesture 402, a direction of the scrolling gesture, or a velocity of the scrolling gesture.

In some examples, the application can determine whether the distance of the scrolling gesture satisfied a distance threshold, such as by meeting or exceeding the distance threshold. In some examples, if the application determines that the distance threshold was satisfied, then the application can return the post 108B to the original size (824). In some examples, if the application determines that the distance threshold was satisfied, then the application can determine whether additional content is available to display (820). If the application determines that the distance threshold was not satisfied, then the application can continue presenting the feed 106 (802).

In some examples, the application can determine whether the direction of the scrolling gesture was in a predetermined direction, such as either up or down. In some examples, if the application determines that the direction of the scrolling gesture was in the predetermined direction, then the application can return the post 108B to the original size (824). In some examples, if the application determines that the direction of the scrolling gesture was in a predetermined direction (such as either up or down), then the application can determine whether additional content is available to display (820). If the application determines that the direction of the scrolling gesture was not in the predetermined direction, then the application can continue presenting the feed 106 (802).

In some examples, the application can determine whether the velocity of the scrolling gesture satisfied a velocity threshold, such as by meeting or exceeding the velocity threshold. In some examples, if the application determines that the velocity of the scrolling gesture satisfied the velocity threshold, then the application can return the post 108B to the original size (824). In some examples, if the application determines that the velocity of the scrolling gesture satisfied the velocity threshold, then the application can determine whether additional content is available to display (820). If the application determines that the velocity threshold was not satisfied, then the application can continue presenting the feed 106 (802).

In some examples, the application can determine whether any combination of one, two, or three of the criteria of distance threshold, direction of the scrolling gesture, and/or or velocity threshold were satisfied and/or met. In some examples, if all one, two, or three of the distance threshold, direction of the scrolling gesture, and/or velocity threshold were satisfied, then the application can return the post 108B to the original size (824). In some examples, if less than all of the one, two, or three of the distance threshold, direction of the scrolling gesture, and/or velocity threshold were satisfied, then the application can continue presenting the feed (802). In some examples, if all one, two, or three of the distance threshold, direction of the scrolling gesture, and/or or velocity threshold were satisfied, then the application can determine whether additional content is available to display (820).

The application can determine whether additional content, such as additional posts 108E, 108F, are available to display (820). The application can determine whether additional content is available to display (820) by, for example, checking a database for posts related to the posts displayed in the feed 106, checking a database for posts by accounts that the user is following, or checking a database for posts of interest to the user, as non-limiting examples.

If the application determines that additional content is not available to display, then the application can cause the display 102 to present a blank area 502 and/or move the feed 106 and/or posts 108B, 108C, 108D in an opposite direction than the posts 108B, 108C, 108D were moved in response to determining that a scroll gesture 402 was received (816), as described above with respect to FIGS. 5A and 5B. After presenting the blank area 502 and/or moving the feed 106 and/or posts 108B, 108C, 108D in the opposite direction, the application can continue presenting the feed (802).

If the application determines that additional content is available to display, the application can return the post 108B to the original size (824) and/or original state. The application can return the post 108B to the original size (824) and/or original state by, for example, reducing an amount of space on the display 102 occupied by the post 108B, decreasing a vertical extension of the post 108B, reducing a size of the avatar 110B, and/or returning the relative locations of the content 114B and avatar 110B to their original relative locations.

After the post 108B has been returned to the original size (824), the application can display additional content (826) on the display 102. The application can display additional content (826) in the space freed by the reduction in size of the post 108B. The application can, for example, display an additional post(s) 108E, 108F, as shown and described with respect to FIG. 6B. After displaying the additional content (826), the application can continue presenting the feed 106 (802).

Figure 9:
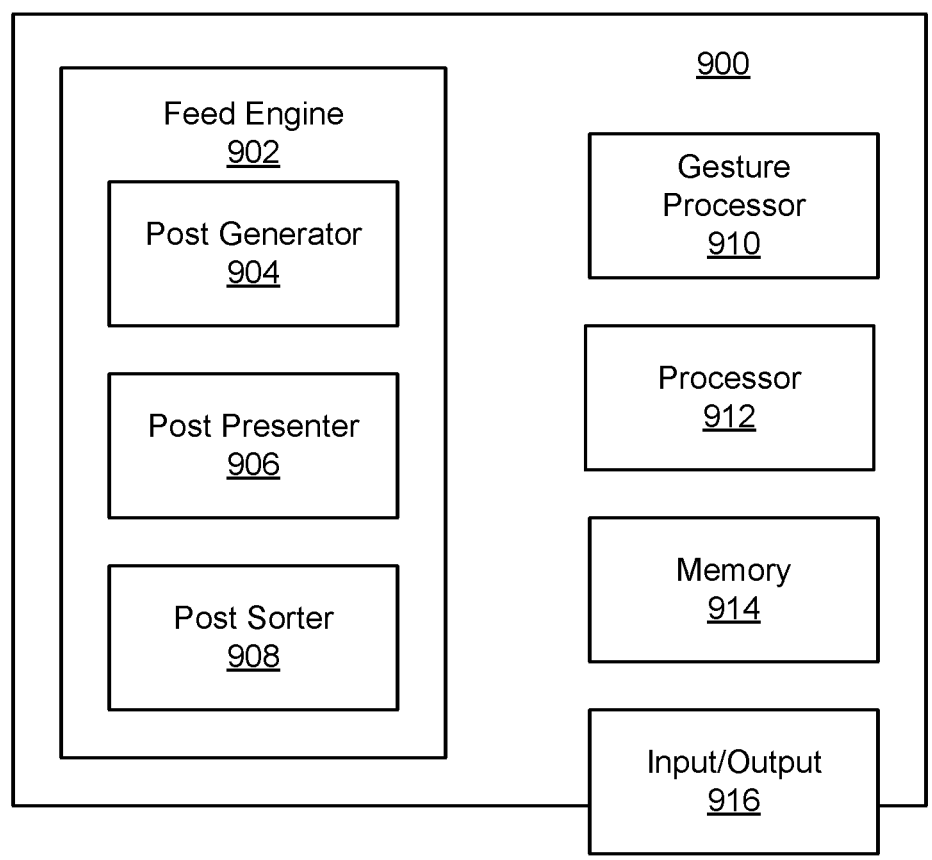
FIG. 9 shows a computer system that can perform the functions described herein.

FIG. 9 shows a computer system 900 that can perform the functions described herein. The computer system 900 can be an example of the computing device 100 described above. The computer system 900 can perform functions described herein while a social media application is running and/or executing on the computer system 900. The computer system 900 can be in communication with a server. The server can provide content to the computer system 900, such as content (including avatars 110A, 110B, 110C, 110D, 110E, handles 112A, 112B, 112C, 112D, 112E, and/or content 114A, 114B, 114C, 114D, 114E) to include in posts 108A, 108B, 108C, 108D, 108E, 108F. In some examples, the computer system 900 can upload content to the server for presentation on other computer systems. In some examples, determinations described as being performed by the computing device 100 and/or computer system 900 can be performed by the server. In some examples, any combination of methods, functions, and/or techniques described herein can be performed by the computer system 900 alone, by the server alone, or by both the computer system 900 and the server in a distributed system.

The computer system 900 can include a feed engine 902. The feed engine 902 can generate the feed 106 for presentation on the display 102 and/or GUI 104.

The feed engine 902 can include a post generator 904. The post generator 904 can generate posts 108A, 108B, 108C, 108D based on content received from the server, such as posts that the server determines may be of interest to the user of the computer system 900. The generated posts 108A, 108B, 108C, 108D can include, for example, avatars 110A, 110B, 110C, 110D, handles 112A, 112B, 112C, 112D, and/or content 114A, 114B, 114C, 114D as described above.

The feed engine 902 can include a post presenter 906. The post presenter 906 can determine how to present posts 108A, 108B, 108C, 108D. The post presenter 906 can determine, for example, a size of each post 108A, 108B, 108C, 108D and/or a size of the avatar 110A, 110B, 110C, 110D included in each post 108A, 108B, 108C, 108D, and/or relative positions of elements, such as the avatar 110A, 110B, 110C, 110D and the content 114A, 114B, 114C, 114D in each post. The post presenter 906 can determine how to present the posts 108A, 108B, 108C, 108D based, for example, on selection gestures, scrolling gestures, and/or associated determinations, as described above.

The computer system 900 can include a post sorter 908. The post sorter 908 can sort posts 108A, 108B, 108C, 108D and/or determine an order in which to present the posts 108A, 108B, 108C, 108D on the display 102, and/or GUI 104. The post sorter 908 can sort the posts 108A, 108B, 108C, 108D based on a determined relevance and/or likelihood that the user is interested in the content of the posts 108A, 108B, 108C, 108D. The display 102 and/or GUI 104 can present and/or display the posts 108A, 108B, 108C, 108D based on the determined order.

The computer system 900 can include a gesture processor 910. The gesture processor 910 can determine whether gestures are received, such as a selection gesture 202, scrolling gesture 404, and/or content gesture. The gesture processor can determine properties of the gestures, such as distance, direction, velocity, and/or location.

The computer system 900 can include at least one processor 912. The at least one processor 912 can execute instructions to cause the computer system 900 to perform any combination of functions, methods, and/or techniques described herein.

The computer system 900 can include at least one memory device 914. The at least one memory device 914 can include a non-transitory computer-readable storage medium comprising instructions stored thereon that, when executed by the at least one processor 912, are configured to cause a computing system such as the computer system 900 to perform any combination of functions, methods, and/or techniques described herein.

The computer system 900 can include at least one input/output node 916. The at least one input/output node 916 can include input nodes for receiving input from a user, such as a touchscreen (which can be an example of the display 102), microphone, buttons, a keyboard, and/or a mouse, as non-limiting examples. The at least one input/output node 916 can include output nodes for providing output to a user, such as a display 102 and/or speaker, as non-limiting examples. The at least input/output node 916 can include nodes for communicating with other computing devices such as a server via access points and/or base stations, such as wired interfaces including an Institute for Electrical and Electronics Engineers (IEEE) 802.3 Ethernet Port, a High-Definition Multimedia Interface (HDMI) port, or a Universal Serial Bus (USB) port, as non-limiting examples, and/or wireless interfaces such as IEEE 802.11 Wireless Fidelity interfaces, Long-term Evolution (LTE) interfaces, or other cellular communication interfaces, as non-limiting examples.

Figure 10:
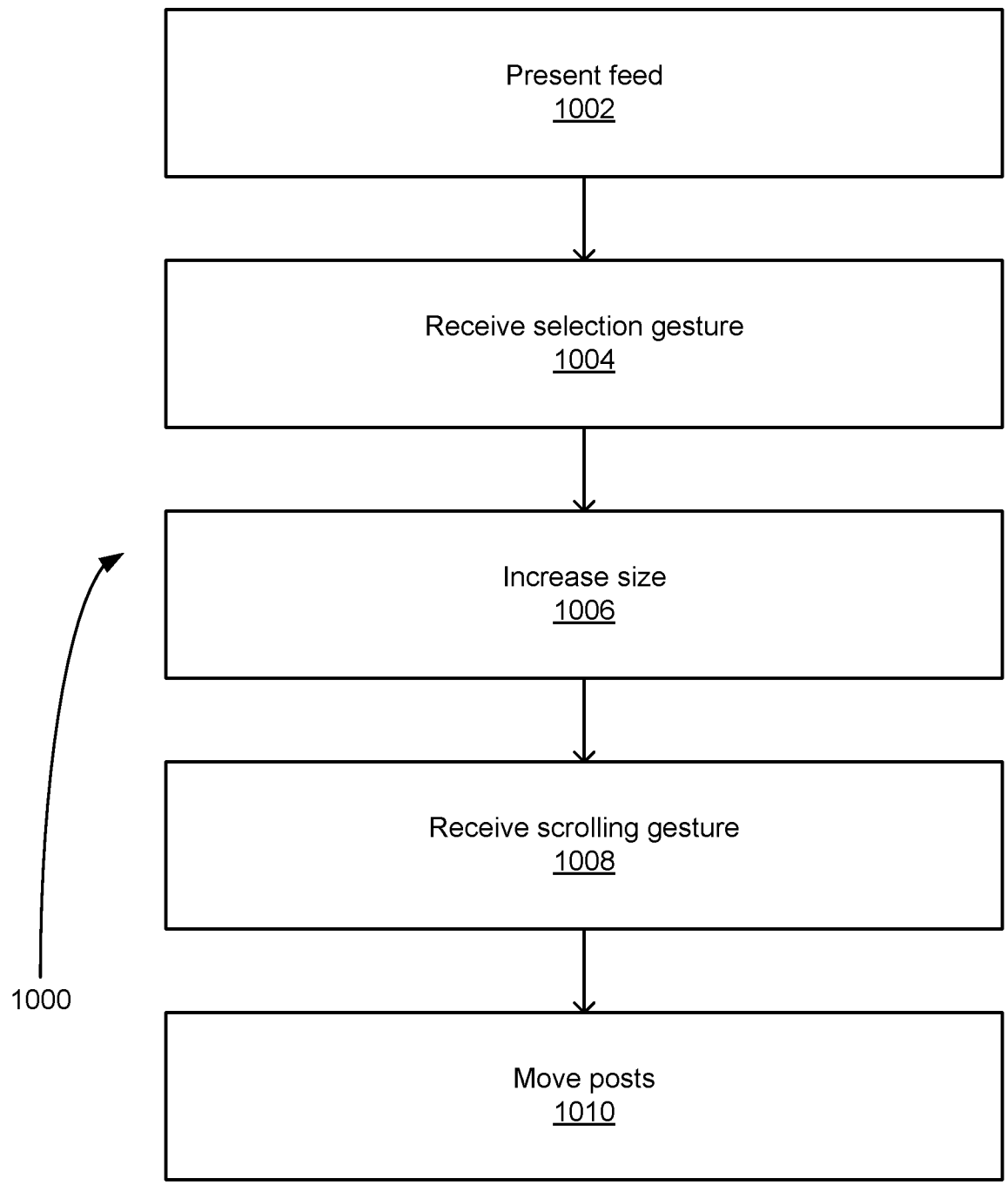
FIG. 10 is a flowchart showing a method of moving a feed while maintaining an expanded size of a post.

FIG. 10 is a flowchart showing a method 1000 of moving a feed while maintaining an expanded size of a post. The method 1000 can include presenting a feed, the feed including at least a first post, a second post, and a third post (1002). The method 1000 can include receiving a selection gesture in an area corresponding to the first post (1004). The method 1000 can include, in response to receiving the selection gesture, expanding a size of the first post from an original size to an expanded size (1006). The method 1000 can include receiving a scrolling gesture (1008). The method 1000 can include, in response to receiving the scrolling gesture, moving the first post, the second post, and the third post in a same direction as the scrolling gesture while maintaining the expanded size of the first post (1010).

According to an example, the first post includes at least an avatar, a handle associated with the avatar, and content uploaded by an account associated with the avatar and the handle.

According to an example, the expanding the size of the first post includes expanding a size of the avatar included in the first post from an original size to an expanded size and changing a location of the content included in the first post relative to the avatar included in the first post.

According to an example, the method can further include determining that a distance of the scrolling gesture satisfied a distance threshold; and based on determining that the distance of the scrolling gesture satisfied the distance threshold, returning the first post to the original size.

According to an example, the method can further include determining that a direction of the scrolling gesture was down; and based on determining that the direction of the scrolling gesture was down, returning the first post to the original size.

According to an example, the method can further include determining that a velocity of the scrolling gesture satisfied a velocity threshold; and based on determining that the velocity of the scrolling gesture satisfied the velocity threshold, returning the first post to the original size.

According to an example, the method can further include in response to receiving the scrolling gesture, determining that additional content is available to display; and based on determining that additional content is available to display, returning the first post to the original size.

According to an example, the method can further include in response to receiving the scrolling gesture, determining that no additional content is available to display; and based on determining that no additional content is available to display, moving the first post, the second post, and the third post in an opposite direction as the scrolling gesture while maintaining the expanded size of the first post.

According to an example, the method can further include presenting an indication of a root post that the first post, second, post, and third post are responsive to.

According to an example, the method can further include receiving a content gesture on the first post; and in response to receiving the content gesture, presenting at least a fourth post, the fourth post replying to the first post.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
presenting a feed, the feed including at least a first post, a second post, and a third post, the first post including at least an avatar and content associated with an account and the avatar;
receiving a selection gesture in an area corresponding to the first post;
in response to receiving the selection gesture, expanding a size of the avatar included in the first post from an original size to an expanded size and changing a location of the content included in the first post relative to the avatar included in the first post;
receiving a scrolling gesture; and
in response to receiving the scrolling gesture, moving the first post, the second post, and the third post in a same direction as the scrolling gesture while maintaining the expanded size of the avatar.

2. The method of claim 1, wherein the first post includes at least the avatar, a handle associated with the avatar, and the content uploaded by the account associated with the avatar and the handle.

3. The method of claim 1, further comprising:
determining that a distance of the scrolling gesture satisfied a distance threshold; and
based on determining that the distance of the scrolling gesture satisfied the distance threshold, returning the avatar to the original size.

4. The method of claim 3, further comprising, based on determining that the distance of the scrolling gesture satisfied the distance threshold, returning the content to an original location relative to the avatar.

5. The method of claim 1, further comprising:
determining that a direction of the scrolling gesture was down; and
based on determining that the direction of the scrolling gesture was down, returning the avatar to the original size.

6. The method of claim 1, further comprising:
determining that a velocity of the scrolling gesture satisfied a velocity threshold; and
based on determining that the velocity of the scrolling gesture satisfied the velocity threshold, returning the avatar to the original size.

7. The method of claim 1, further comprising:
in response to receiving the scrolling gesture, determining that additional content is available to display; and
based on determining that additional content is available to display, returning the avatar to the original size.

8. The method of claim 1, further comprising:
in response to receiving the scrolling gesture, determining that no additional content is available to display; and
based on determining that no additional content is available to display, moving the first post, the second post, and the third post in an opposite direction as the scrolling gesture while maintaining the expanded size of the avatar.

9. The method of claim 1, further comprising presenting an indication of a root post that the first post, second post, and third post are responsive to.

10. The method of claim 1, further comprising receiving a content gesture on the first post; and in response to receiving the content gesture, presenting at least a fourth post, the fourth post replying to the first post.

11. A non-transitory computer-readable storage medium comprising instructions stored thereon that, when executed by at least one processor, are configured to cause a computing system to:
present a feed, the feed including at least a first post, a second post, and a third post, the first post including at least an avatar and content associated with an account and the avatar;
receive a selection gesture in an area corresponding to the first post;
in response to receiving the selection gesture, expand a size of the avatar included in the first post from an original size to an expanded size and changing a location of the content included in the first post relative to the avatar included in the first post;
receive a scrolling gesture; and
in response to receiving the scrolling gesture, move the first post, the second post, and the third post in a same direction as the scrolling gesture while maintaining the expanded size of the avatar.

12. The non-transitory computer-readable storage medium of claim 11, wherein the instructions are further configured to cause the computing system to:
determine that a distance of the scrolling gesture satisfied a distance threshold; and
based on determining that the distance of the scrolling gesture satisfied the distance threshold, return the avatar to the original size.

13. The non-transitory computer-readable storage medium of claim 11, wherein the instructions are further configured to cause the computing system to:
determine that a direction of the scrolling gesture was down; and
based on determining that the direction of the scrolling gesture was down, return the avatar to the original size.

14. The non-transitory computer-readable storage medium of claim 11, wherein the instructions are further configured to cause the computing system to:
determine that a velocity of the scrolling gesture satisfied a velocity threshold; and
based on determining that the velocity of the scrolling gesture satisfied the velocity threshold, return the avatar to the original size.

15. The non-transitory computer-readable storage medium of claim 11, wherein the instructions are further configured to cause the computing system to:
in response to receiving the scrolling gesture, determine that additional content is available to display; and
based on determining that additional content is available to display, return the avatar to the original size.

16. The non-transitory computer-readable storage medium of claim 11, wherein the instructions are further configured to cause the computing system to:
in response to receiving the scrolling gesture, determine that no additional content is available to display; and
based on determining that no additional content is available to display, move the first post, the second post, and the third post in an opposite direction as the scrolling gesture while maintaining the expanded size of the avatar.

17. A computing system comprising:
at least one processor; and a non-transitory computer-readable storage medium comprising instructions stored thereon that, when executed by at least one processor, are configured to cause a computing system to:
  present a feed, the feed including at least a first post, a second post, and a third post, the first post including at least an avatar and content associated with an account and the avatar;
  receive a selection gesture in an area corresponding to the first post;
  in response to receiving the selection gesture, expand a size of the avatar included in the first post from an original size to an expanded size and changing a location of the content included in the first post relative to the avatar included in the first post;
  receive a scrolling gesture; and
  in response to receiving the scrolling gesture, move the first post, the second post, and the third post in a same direction as the scrolling gesture while maintaining the expanded size of the avatar.

18. The computing system of claim 17, wherein the instructions are further configured to cause the computing system to:
  determine that a distance of the scrolling gesture satisfied a distance threshold; and
  based on determining that the distance of the scrolling gesture satisfied the distance threshold, return the avatar to the original size.

19. The computing system of claim 17, wherein the instructions are further configured to cause the computing system to:
  in response to receiving the scrolling gesture, determine that additional content is available to display; and
  based on determining that additional content is available to display, return the avatar to the original size.

20. The computing system of claim 17, wherein the instructions are further configured to cause the computing system to:
  in response to receiving the scrolling gesture, determine that no additional content is available to display; and
  based on determining that no additional content is available to display, move the first post, the second post, and the third post in an opposite direction as the scrolling gesture while maintaining the expanded size of the avatar.

* * * * *